United States Patent Office 2,877,606
Patented Mar. 17, 1959

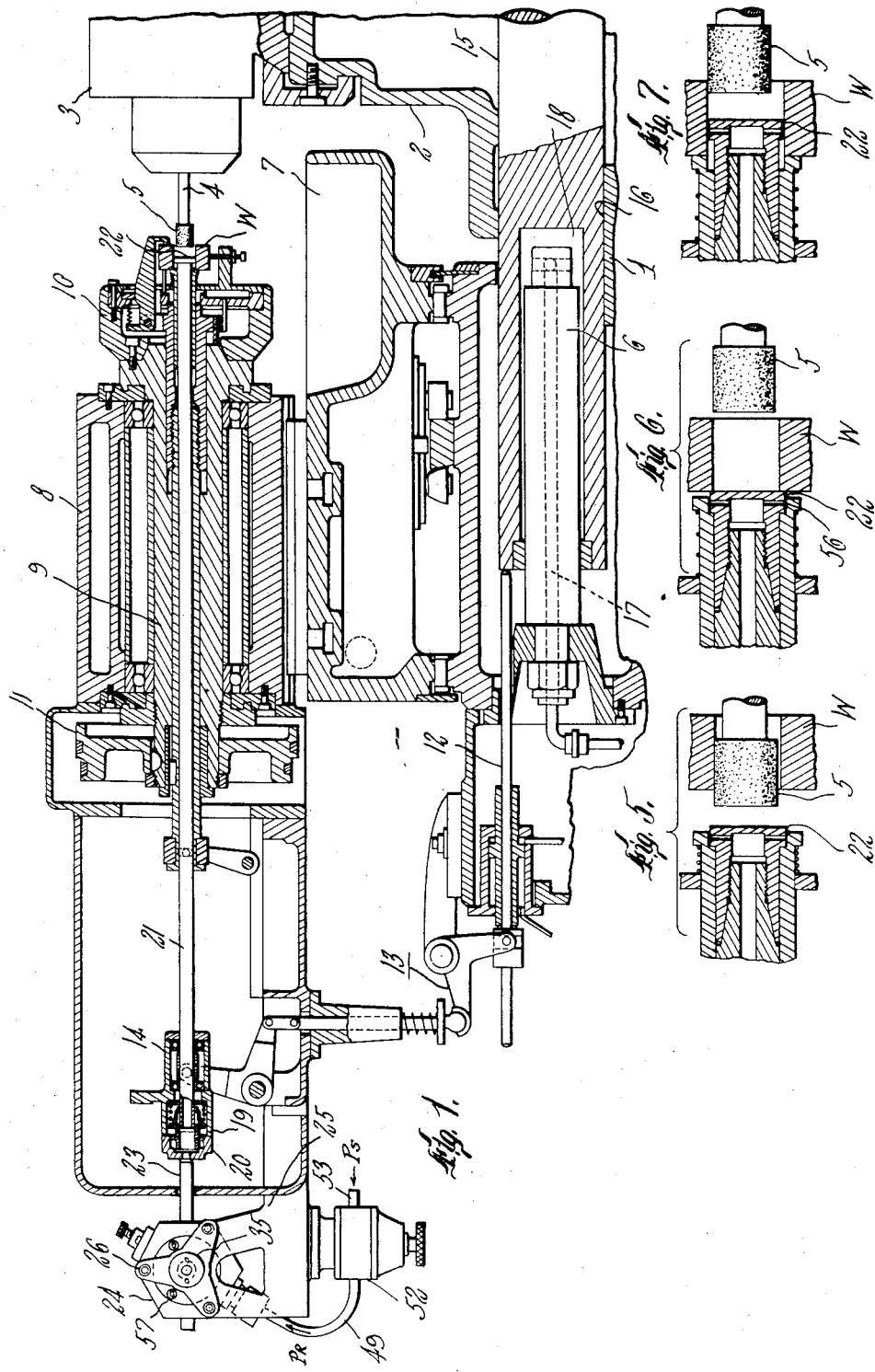

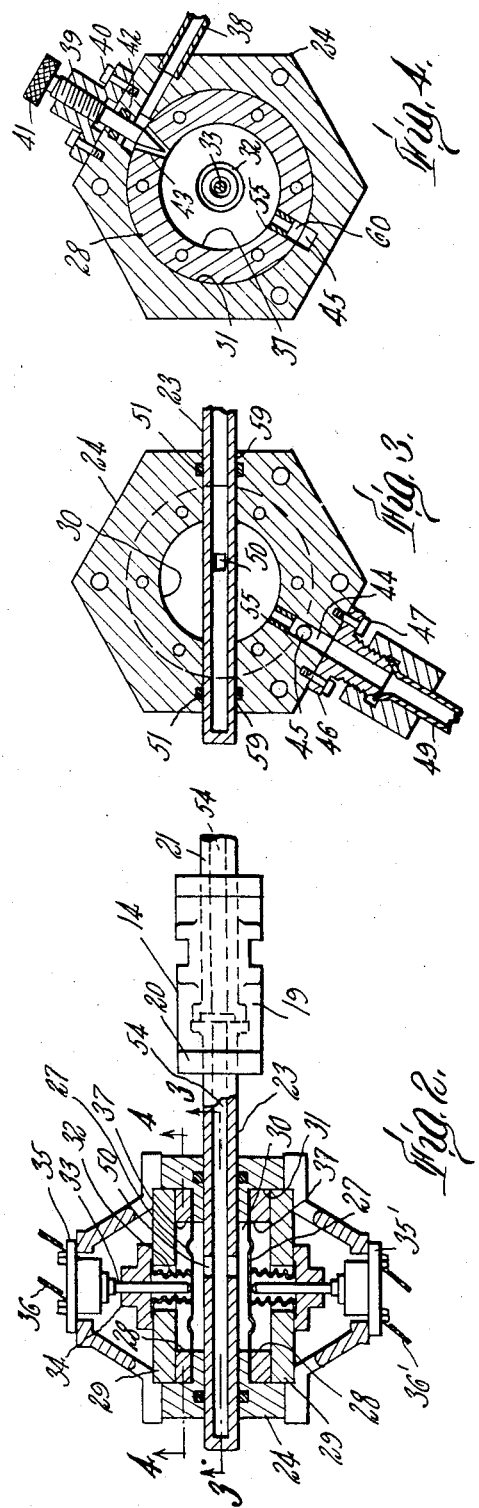

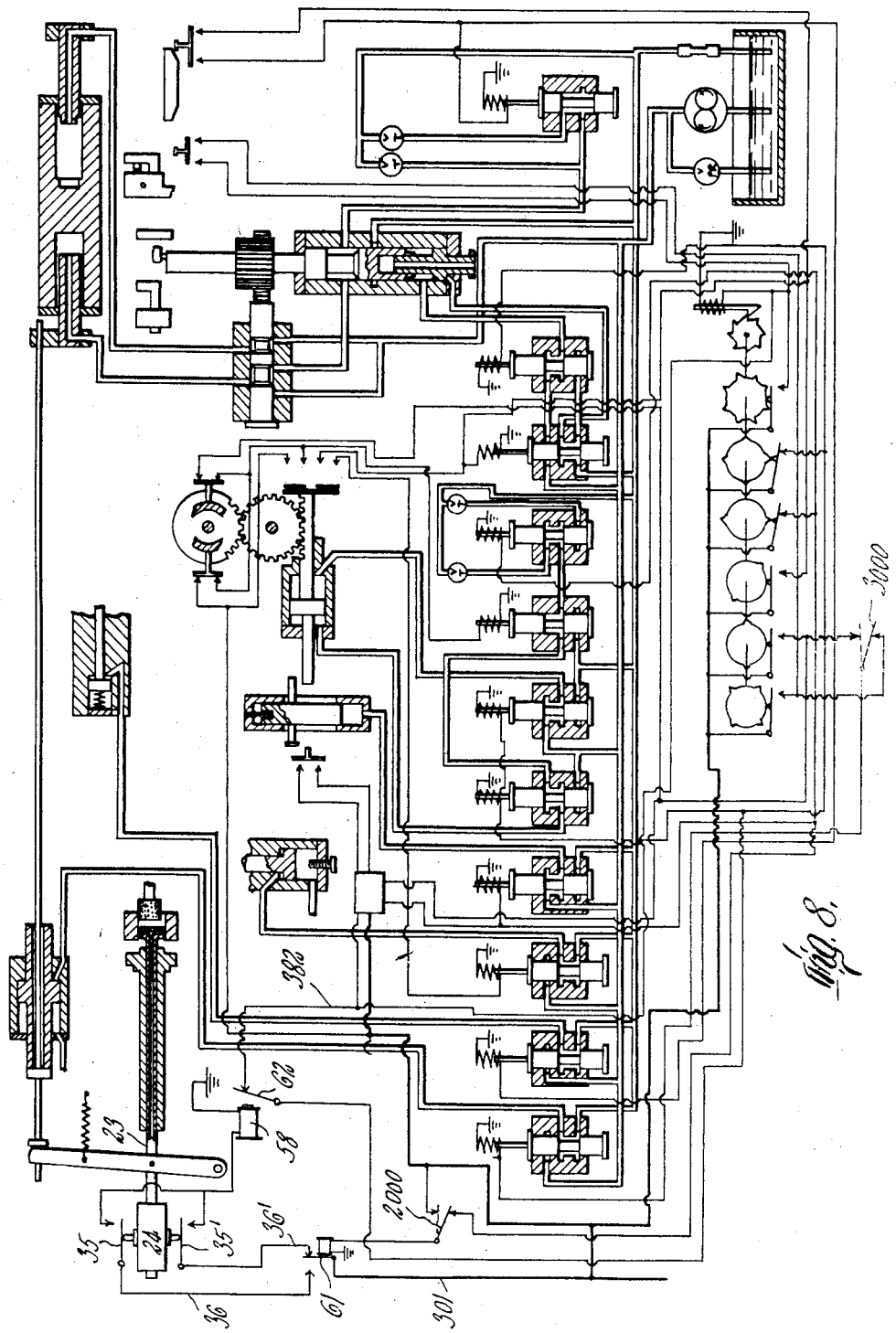

2,877,606

AUTOMATIC SIZING MECHANISMS

Thor H. Ljunggren, Springfield, Vt., assignor to Bryant Chucking Grinder Company, Springfield, Vt., a corporation of Vermont Application September 23, 1954, Serial No. 457,940

10 Claims. (Cl. 51—50)

This invention relates to internal grinding machines and more particularly to automatic sizing mechanisms for such machines.

Automatic sizing mechanisms for internal grinding machines have been known in the art for several years. For example, one of the most effective of such mechanisms is that shown in the patent to Bryant et al. No. 2,585,533 wherein is employed an air plug gage which intermittently senses a workpiece bore diameter and automatically controls the machine in accordance with such diameter to change the machine cycle from rough to finish grind and finally to terminate the finish grind cycle when the desired bore diameter has been reached.

Although such air plug gage mechanism is suitably accurate it has a number of disadvantages, the most important of which is its relatively slow response which seriously limits the minimum time within which the grinding of a workpiece can be completed. Furthermore, the measuring element of such air gage mechanism is quite sensitive to vibration, which, as a practical matter, requires the mounting of such measuring element in a position remote from the workpiece carriage upon which the air plug gage element itself is mounted. Such remote mounting is in itself a disadvantage as it requires a relatively long length of flexible interconnecting air transmission line which further increases the response time of the mechanism because of the relatively large volume of air therein, as well as causing other difficulties.

It has been found that shortened response time and resistance to vibration may be achieved by the use of internal grinding machine sizing mechanisms employing a relatively non-compressible fluid such as, for example, water or oil, rather than a compressible fluid such as air, and by the employment of liquid actuated measuring elements which are not vibration sensitive and hence may be mounted directly on the reciprocating workpiece slide, thus further improving the response time by virtue of the elimination, at least in liquid gage mechanism, of long interconnecting transmission lines between the plug gage and the measuring element, although a short flexible transmission line is still needed. Gaseous gage mechanisms, however, since their heretofore known measuring elements are relatively vibration sensitive, all as pointed out above, have been mounted remotely from the reciprocating slide requiring a long flexible transmission line with its attendant problems.

It is an object of the present invention to provide a novel internal grinding machine sizing mechanism using either a gas or a liquid, such mechanism including a plug gage element connected by a transmission line to a novel measuring element effective to control the cycle of said machine.

It is a feature of the invention that the novel measuring element provided is relatively insensitive to vibration, even when used with a gaseous medium, enabling it to be mounted directly on the reciprocating workpiece slide and so entirely eliminate a flexible interconnecting fluid transmission line.

It is a further feature of the invention that fluids already in use in an internal grinding machine may be used in the novel gage and measuring element of the invention, namely, either the compressed air employed with automatic loading mechanisms, for example, or the liquid coolant commonly employed to cool and flush a workpiece surface during the grinding operation.

Further objects and features of the invention will be apparent from the following description of a preferred embodiment thereof together with the accompanying drawings in which:

Fig. 1 is a fragmentary vertical, sectional view of an internal grinder through the headstock and the workpiece and wheel slides showing the slide mountings, and the gage of the invention with its actuating parts in relationship to the workpiece;

Fig. 2 is a horizontal, sectional view of the measuring means of the gage of the invention, as well as adjacent parts including part of the gage stem;

Fig. 3 is a vertical, sectional view taken along line 3—3 of Fig. 2;

Fig. 4 is a vertical, sectional view taken along line 4—4 of Fig. 2;

Figs. 5, 6, and 7 are sectional views to a larger scale showing the relative position between a workpiece, a grinding wheel, and the plug gage sensing element and related parts for different positions of the grinding wheel as it progresses during the reciprocatory movement of the wheelslide;

Fig. 8 is a schematic diagram of the control system of an internal grinding machine embodying the invention; and Fig. 9 is a schematic diagram of the fluid system of the gage of the invention.

Referring to the drawings, in Fig. 1 is indicated an internal grinding machine including a machine base 1 having at least two bearings 16 supporting a sliding element 15 arranged for reciprocatory movement. The fragmentary view in Fig. 1 only shows one bearing 16 and part of element 15, but it should be well understood that the base has at least one other bearing supporting the other end of element 15, this end being exactly like the end shown and having a cylinder part 18 and a hydraulic ram 6 through which runs a hydraulic supply line 17 connected to a pressurized fluid power and control mechanism for effecting aforesaid reciprocatory movement, all as is well known in the art. On element 15 is mounted the tool slide 2 which in turn supports the tool driving head 3 in which is mounted the rotatable tool spindle 4, the outer end of said tool spindle having mounted thereon a grinding wheel 5.

On the opposite side of base 1 is mounted the headstock slide 7 supported by suitable means to allow for a transverse movement relative to the longitudinal axis of the tool slide mechanism above described, said slide 7 having mounted on the top surface thereof a headstock 8 in which a hollow bored headstock spindle 9 is journaled for rotative movement by driving means here shown as a V-belt pulley 11 for driving a workholding device 10 or chuck mounted on the nose at the other end of said spindle 9. The workholding device 10 grips and locates the workpiece "W" (here shown as an annular ring on which a grinding operation is to be carried out on the inner surface thereof by the grinding wheel 5) which wheel is shown in Figs. 1 and 6 approaching to enter into the grinding zone. In Fig. 6 is also shown the gage head 22 butting against the end face of the workpiece opposite from the approaching grinding wheel.

The gage head 22 which forms the sensing element of the gage of the invention by means of a lateral gaging orifice 56 adapted to be positioned at a closely spaced distance from a workpiece surface, as will presently be described, is attached to the right extreme end of the gage stem 21 in communication therewith, which gage stem is preferably rotated with the headstock spindle and given a reciprocatory movement, said movement being synchronized with the movement of the wheel 5 as clearly indicated in Figs. 5, 6, and 7. Such rotary and reciprocating action is provided by mechanism well known in the art and includes a pushrod 12 held by spring pressure against the sliding element 15 which participates in the reciprocatory movement of the system of which element 15 is an integral part. The rod 12 is attached to a bellcrank of a synchronizing mechanism here indicated at 13. Another bellcrank of said mechanism effects the movement of housing 14, said housing being located on the left end of gage stem 21. Said housing is therefore reciprocated synchronously with the tool slide 2. The housing 14 journals the gage stem 21 for rotative movement and the left extreme of said gage stem 21 has attached to it a conventional rotating seal indicated at 19, said seal cooperating with the right end face of a telescoping tube 23 forming a seal between the rotating part 21 and non-rotating part 23 and hermetically sealing the fluid transmission passage 54 formed inside said two parts 21 and 23. The telescoping tube 23 is solidly attached to housing 14 by flange 20 and therefore will follow the reciprocatory movement of the system of which housing 14 is a part. To the headstock 8 is attached a bracket 25 extending from said headstock to the left as shown in Fig. 1, said bracket having at its extreme left and extending in an upward direction a lug forming a support for an instrument housing 24 which is fastened to the bracket by screws 26.

As shown in Figs. 2, 3, and 4, the instrument housing member 24 is preferably of hexagonal form with flat end faces and a cylindrical central bore 30 perpendicular thereto, which bore provides a central chamber. Opposed bores 31 concentric with said bore 30 and of somewhat larger diameter are provided extending from the end faces of member 24 for equal distances toward each other. Along the bottoms of the flat annular surfaces of said bores 31 are provided diaphragms 27, annular rings 28 having bores 37 substantially the same as that of bore 30 being positioned thereon. Finally, on top of said rings 28 are positioned annular caps 29 and the elements 24, 27, 28, and 29 are bolted together by bolts 57 making a unit and forming by means of the diaphragms 27 a central chamber formed by the bore 30 and two outer chambers formed by the bore 37. Through central openings in caps 29 extend flexible metallic bellows 32, each of said bellows having a closed end abutting the diaphragms 27, with the other end being open with flanges suitably connected to caps 29 as by solder, thus closing the central openings in the caps and providing a pair of enclosed side chambers. Smaller caps 34 are preferably placed over the open ends of bellows 32 being attached to caps 29 by any suitable means. The caps 34 have central bores forming bearings for trigger rods 33, one end of which abuts the inner face of the closed end of a bellows 32 and the other end of which contacts the actuating button of an electric switch element 35 or 35' having leads 36 and 36'. Said switches are mounted on bracket 25 and the leads thereof are selectively connected (Fig. 8) by relay 61 to power line 301, so that one of said switches energizes the coil of relay 58 and 58' to operate its switch 62 and 62' to control the machine cycle by means of apparatus that is well known in the art and forms no part of this invention. Relay 61 is itself controlled by the cycle controlling apparatus through switch 2000. Such apparatus is described in, for example, earlier referred to U. S. Patent No. 2,585,533, Fig. 8 herein corresponding to Fig. 10 of said patent with certain modifications as shown in said Fig. 8 and above described.

The instrument housing member 24 has, as best seen in Fig. 3, perpendicular to said bore 30 and extending through the axis thereof a through bore 59 forming bearings for the reciprocable telescoping tube 23, said bearing containing seals 51 here indicated as O-rings to prevent pressurized fluid in the central chamber formed by bore 30 from escaping to the atmosphere. In the side wall of hollow tube 23 is formed one or more openings 50 connecting said central chamber with the transmission passage 54 in parts 23 and 21. The openings 50 are so located that they always are inside chamber 30 whatever position the telescoping tube 23 has during its reciprocatory gaging movement and the area of said openings 50 should preferably sum up to at least the cross-sectional area of transmission passage 54. A drilled passage 44 is provided leading into the bore 30 through the wall of central member 24, tube connector 46 being mounted thereover on the outer wall of said member by screws 47. The tube connector holds one end of a tube 49, the other end of which tube is connected to a supply of fluid under constant pressure from regulator 52 which in its turn is supplied with line pressure fluid from a suitable source, for example, such as a coolant tank and pump (not shown) through line 53 (Fig. 1), although air pressure could alternatively be used. In Fig. 4 is shown in section one of the outer chambers formed by bores 37, both of which chambers are physically identical. From the aforesaid passage 44 leads a connecting passage 45 in member 24 and ring 28 at substantially right angles to passage 44 for a distance preferably half way of the thickness of ring 28, said passage 45 registering with a radially drilled passage 60 in ring 28 extending to its bore 37 so that the outer chambers formed by said bore, as well as the central chamber formed by bore 30, are in communication with the regulated fluid supply from tube 49. The passages 44 and 60 are preferably provided with restrictive tubes or orifices 55.

On the outer surface of member 24 and substantially centrally of each of the side chambers formed by bores 37 is mounted by screws 40 a valve cap 39 having a threaded central bore for a needle valve 41. Such needle valve has in its outer free end a hand knob for manual adjustment, a threaded stem, a plain portion journaled in a bore of central housing member 24, and a seal 42 preventing leakage from bleed line 38. The other end of the needle valve has the conventional taper which registers with the valve seat 43 in ring 28 forming an adjustable restriction between each chamber formed by a bore 37 and bleed line 38. Such bleed line can readily be connected if desired to a line for returning the overflow to the tank of the source of the pressurized fluid supply if a liquid be used.

In operation, a fluid regulated to a substantially constant pressure $P_R$ is introduced through the passage 44. This fluid or pressure media (which may be either liquid or gas) is by way of passage 45 distributed to the outer chambers as well as to the central chamber. However, before entering each of said chambers, the fluid has to overcome the resistance R of restrictions 55 which, for simplicity, can herein be considered to be of the same magnitude. From the central chamber 30 leads, as above described, a passage 54 to the sensing element 22 having at least one opening outwardly ending in a restrictive tube forming a lateral gaging orifice 56 which may be positioned at a closely spaced distance $d$ from a workpiece surface, thus constituting a resistance $R_2$ imposed by the presence of said workpiece.

If it is assumed that the openings at the orifices 56 are entirely closed and the needle valves 41 also closed, the pressure in the central chamber and the outer chambers and in passage 54 will be equal to pressure $P_R$. Now instead, if a workpiece as indicated by "W" is introduced over the sensing element 22 leaving a distance $d$ between the orifice 56 and the wall of "W," the pressure media will then escape at a rate depending on the magnitude of $d$ and a pressure drop will occur between the restriction $R_2$ and the central restriction $R_1$ to a value of gage pressure $P_G$. In other words, if $P_R$ is constant, $P_G$ will vary as $d$ is varied and, since $d$ affects $R_2$, then $P_G$ can be used as an indication of $d$.

During the above assumed condition with the needle valves 41 closed, the pressure in a chamber 31 is equal to $P_R$ and there is a pressure drop of magnitude $P_G$ in chamber 30. Thus, the diaphragm 27 will move inwardly towards chamber 30 and this movement is used to register a predetermined value of $P_G$.

However, one object of this invention is to provide more than one value of signal as, for example, to shift the machine from a rough grind cycle to a finish grind cycle and then to terminate the finish grind cycle when the desired workpiece bore diameter is reached. This is accomplished by the use of the pair of diaphragms 27 providing two outer chambers, each of these chambers having a variable resistance in the form of a neede valve 41. By independently adjusting such needle valves, the pressure in the outer chambers can be individually regulated to correspond to a certain pressure difference in magnitude depending on pre-selected values of $d$.

In the diagram (Fig. 9) is illustrated a condition wherein, since the aim is to move the diaphragms outwardly from the central chamber, the highest pressure in the outer chambers must not be more than $P_G$ when $d$ is infinite. The values of the pressure in said outer chambers is thus regulated in such a way that the upper diaphragm of Fig. 9 will react at a value of $P_G$ depending on a value of $d$ commensurate with the selected size of workpiece "W" at what can be called the "roughing dimension," and the lower diaphragm will react at a value of $P_G$ depending on a value $d$ commensurate with the selected size of workpiece "W" at what can be called the "finishing dimension." Said reactive values are denoted as $P_X$ and $P_Y$, respectively. It is obvious that since $P_Y$ is the lower value it will cause reaction when reaction takes place at the higher value $P_X$. This is, however, of no matter since the electric circuit above described is conditioned accordingly.

Considering now a grinding machine with a sequence controlled operating cycle as in U. S. Patent No. 2,585,533, in the rough grinding phase or step of the cycle, the plug or sensing element 22 is introduced to the workpiece "W" and at the same time the selector switch 61 is moved to make the circuit X operative. When the sensing element thus is introduced, the value of pressure $P_G$ becomes larger than the value of $P_X$ and the upper diaphragm 27 moves inwardly of the upper outer chamber, and by means of the trigger rod closes upper switch 35 energizing control relay 58, thus opening switch 62. Since the machine is conditioned for a rough grinding rate of operation, the proper position of double pole switch 61 is selected. As the work proceeds, the distance and value of $d$ becomes progressively larger and when this value has reached a point when $P_G$ equal $P_X$, the diaphragm returns to its normal position, and allows the switch 35 to reopen, thus de-energizing relay coil 58 which opens switch 62 and the roughing grind step of the machine cycle is discontinued.

In the finish grinding phase or step of the cycle which now follows in sequence, the plug or sensing element 22 is re-introduced to the workpiece "W," however, this time the selector switch 61 is moved by the machine control to make circuit Y operative. The operation proceeds as described above during the rough grinding phase and when the distance $d$ is of a magnitude causing $P_G$ to equal $P_Y$, the lower diaphragm returns to its normal position, the lower switch 35' re-opens, thus de-energizing coil 58 which opens switch 62 and thereby terminates the finish grind step of the machine cycle.

It is to be observed that the sensing element 22 has a reciprocatory movement and passes in and out of the workpiece out of the way and in step with advancement and retraction of the grinding wheel 5. This means that the sensing element presents its orifice 56 to free space and $d$ becomes infinite with the result that a drop in the value of pressure $P_G$ would occur with adjunct undesirable movement of diaphragms 27. To prevent this undesirable action, several means can be used, one such means being that as disclosed in U. S. Patent No. 2,585,533 wherein a sleeve envelopes the sensing element when retracted from the workpiece and in this way prevents a pressure drop. Such pressure fluctuations can also be ignored by arranging a suitable time delay circuit in which case the relay of the indicating and operating means cannot become effective to operate said means before a predetermined time has lapsed. However, such time delay means is only acceptable with comparatively slow operation of an operating cycle, which is undesirable with modern high speed automatic grinders. Furthermore, the above-described method using an enveloping sleeve also has shortcomings which specially come to the fore when using a liquid as pressure media. Accordingly, I prefer to use an auxiliary restriction 48 in the gage stem passage near the sensing element. A restriction located in this position delays the pressure drop and momentarily prevents it from reaching and actuating the diaphragms 27 during the short period when the sensing element 22 passes out of the workpiece "W."

Thus, I have described an improved sizing device which is fast, versatile and easily adjusted to changing conditions and demands. By eliminating the flexible looped transmission line connection between the sensing element and the measuring apparatus that heretofore has been necessary and substituting therefor means in form of a telescoping tube, a construction is derived that is not suscepible to volume changes in the chamber enclosing the fluid pressure media with adjunct influence on the exactness and sensitivity of the apparatus, said volume changes in earlier devices being a limiting factor in the desired high speed of reaction and rapid stabilization of the indicating means when air was used. Furthermore, such is true to even a higher degree when a liquid is used.

It is understood that certain features and sub-combinations are of utility and may be employed without reference to other features and sub-combinations. This is contemplated by and within the scope of the claims and it is obvious that various changes may be made in detail within the scope of the claims without departing from the spirit of the invention, and it is therefore understood that the invention is not limited to the specific embodiment shown and described.

Having thus disclosed and described my invention, I claim:

1. A fluid gage mechanism comprising workpiece supporting means, a sensing element provided with a hollow stem having a wall opening therein and a lateral gaging orifice communicating therewith adapted to be positioned at a closely spaced distance from the surface of a workpiece supported by said workpiece supporting means, means for reciprocating said sensing element relative to a workpiece supported by said workpiece supporting means, fluid supply means for providing a flow of liquid through said hollow stem and outwardly through said orifice, a transducer element having a chamber extended in the direction of movement of said sensing element, and means for supporting said transducer element in fixed position relative to a workpiece supported by said workpiece supporting means with its chamber in register with said wall opening in said hollow stem throughout the gaging reciprocation of said sensing element, said transducer element being responsive to the restriction in fluid flow from said orifice imposed by the presence of a workpiece at a spaced distance therefrom.

2. A fluid gage mechanism comprising workpiece supporting means, a sensing element provided with a hollow stem having a wall opening therein and a lateral gaging orifice communicating therewith adapted to be positioned at a closely spaced distance from the surface of a workpiece supported by said workpiece supporting means, means for reciprocating said sensing element relative to a workpiece supported by said workpiece supporting means, liquid supply means for providing a flow of liquid through said hollow stem and outwardly through said orifice, a transducer element having a pressure responsive chamber extended in the direction of movement of said sensing element, and means for supporting said transducer element in fixed position relative to a workpiece supported by said workpiece supporting means with its chamber in register with said wall opening in said hollow stem throughout the gaging reciprocation of said sensing element, said transducer chamber being responsive to the restriction in liquid flow from said orifice imposed by the presence of a workpiece at a spaced distance therefrom.

3. A fluid pressure responsive mechanism comprising a transducer element having a central chamber, a hollow transmission line reciprocally mounted on said transducer element and extending through said chamber, said line having an opening therein communicating with said chamber, and means for reciprocating said transmission line relatively to said chamber while said opening remains in communication with said chamber.

4. A fluid pressure responsive mechanism comprising a transducer element having a central chamber, a hollow transmission line reciprocally mounted on said transducer element and extending through said chamber, said line being of substantially uniform volume at all positions within said chamber and having an opening therein communicating with said chamber, and means for reciprocating said transmission line relatively to said chamber while said opening remains in communication with said chamber.

5. A fluid pressure responsive mechanism as claimed in claim 4 in which said transducer includes flexible diaphragm means in communication with said chamber, and electric switch means actuated by said diaphragm means at a pre-selected pressure of fluid within said chamber.

6. A fluid pressure responsive mechanism comprising a transducer element having a central chamber and a side chamber with flexible diaphragm means therebetween, a hollow transmission line reciprocally mounted on said transducer element and extending into said central chamber, said line having an opening communicating with said central chamber, means for reciprocating said transmission line relatively to said central chamber while said opening remains in communication with said central chamber, and control means responsive to the movement of said diaphragm means.

7. A fluid pressure responsive mechanism as claimed in claim 6, in which means are provided for supplying fluid to each of said chambers at independent pressures.

8. A fluid pressure responsive mechanism as claimed in claim 6 having means for supplying fluid to each of said chambers, and valve means for bleeding fluid from one of said chambers.

9. A fluid pressure responsive mechanism as claimed in claim 6 having a plurality of side chambers, together with independent means responsive to movement of each of the diaphragm means between said side chamber and said central chamber.

10. A fluid pressure responsive mechanism as claimed in claim 9, further having valve means communicating with each of said side chambers for bleeding fluid from said side chambers.

References Cited in the file of this patent

UNITED STATES PATENTS

| | | |
|---|---|---|
| 1,993,830 | Conover | Mar. 12, 1935 |
| 2,564,527 | Fortier | Aug. 14, 1951 |
| 2,585,533 | Bryant et al. | Feb. 12, 1952 |
| 2,771,714 | Schmidt et al. | Nov. 27, 1956 |